(12) United States Patent
Elden et al.

(10) Patent No.: US 10,832,217 B2
(45) Date of Patent: Nov. 10, 2020

(54) BLOCKCHAIN-BASED WORKFLOW SYSTEM

(71) Applicant: ADP, LLC, Roseland, NJ (US)

(72) Inventors: Guy James Elden, Parsippany, NJ (US); Mitchel Jon Maio, Moorpark, CA (US); James Caldwell Ford, Orleans, MA (US)

(73) Assignee: ADP, LLC, Roseland, NJ (US)

( * ) Notice: Subject to any disclaimer, the term of this patent is extended or adjusted under 35 U.S.C. 154(b) by 230 days.

(21) Appl. No.: 16/013,890

(22) Filed: Jun. 20, 2018

(65) Prior Publication Data
US 2019/0392392 A1 Dec. 26, 2019

(51) Int. Cl.
*G06Q 10/10* (2012.01)
*G06Q 10/06* (2012.01)
*G06Q 10/08* (2012.01)
*G06Q 30/06* (2012.01)
*G06Q 30/02* (2012.01)
*H04L 9/06* (2006.01)

(52) U.S. Cl.
CPC ....... *G06Q 10/103* (2013.01); *G06Q 10/0633* (2013.01); *G06Q 10/06311* (2013.01); *H04L 9/06* (2013.01); *H04L 2209/38* (2013.01)

(58) Field of Classification Search
CPC ............. G06Q 10/103; G06Q 10/0633; G06Q 10/06311; H04L 9/06; H04L 2209/38
USPC .......................................... 705/1.1–912, 301
See application file for complete search history.

(56) References Cited

U.S. PATENT DOCUMENTS

| | | | |
|---|---|---|---|
| 2018/0157825 A1* | 6/2018 | Eksten | H04L 9/3239 |
| 2018/0276625 A1* | 9/2018 | Saye | G06Q 20/023 |
| 2019/0123889 A1* | 4/2019 | Schmidt-Karaca | H04L 9/3236 |
| 2019/0132350 A1* | 5/2019 | Smith | G06F 21/577 |
| 2019/0213518 A1* | 7/2019 | Lee | G06Q 20/32 |

* cited by examiner

*Primary Examiner* — Jonathan P Ouellette
(74) *Attorney, Agent, or Firm* — Yee & Associates, P.C.

(57) ABSTRACT

A method, computer system, and computer program product are provided for managing tasks of employees within a blockchain-based workflow system. A workflow transaction associated with a workflow stage is received from an employee. The workflow system records the workflow transaction in a workflow blockchain. Based on a smart contract recorded within the blockchain, the workflow system determining a role for the employee is authorized to perform the transaction. If authorized, the workflow system executes a set of resulting transactions indicated by the smart contract and updates at least one condition for completion of the workflow stage. When the workflow system determines that all conditions indicated in the smart contract have been completed, the workflow system finalizes the workflow stage and advances the workflow to a subsequent stage.

18 Claims, 9 Drawing Sheets

US 10,832,217 B2

BLOCKCHAIN-BASED WORKFLOW SYSTEM

BACKGROUND INFORMATION

1. Field

The present disclosure relates to a use of smart contracts implemented in a blockchain-based workflow system.

2. Background

A distributed ledger, as used throughout this document, refers to a computer-only technology that enables the distributed recordation of transactions through a distributed ledger maintained by a network of computers. A blockchain is an example of a distributed ledger. BITCOIN® is an example of a blockchain technology application.

A blockchain is a type of distributed ledger, which includes digitally recorded, unmodifiable data in packages called blocks. A distributed ledger is a consensus of replicated, shared, and synchronized digital data geographically spread across multiple computers which may be in different sites, countries, and/or institutions maintained by many different parties. A distributed ledger can be public, such as BITCOIN®, where there is no limitation on who may participate in the network, or private, where only approved parties are permitted to participate in the network.

SUMMARY

The illustrative embodiments provide a method for managing tasks of employees within a blockchain-based workflow system. A computer system receives a workflow transaction from an employee. The workflow transaction is associated with a first stage of the workflow. The computer system records the workflow transaction in a workflow blockchain. The computer system determines whether a smart contract authorizes a role for the employee to perform the workflow transaction. The smart contract is recorded within the workflow blockchain. Responsive to determining that the role is authorized to perform the transaction, the computer system executes a set of resulting transactions indicated by the smart contract and updates at least one condition indicated in the smart contract for completion of the first stage of the workflow. The computer system determines whether all conditions indicated in the smart contract for completion of the first stage of the workflow have been completed. Responsive to determining that all conditions indicated in the smart contract have been completed, the computer system finalizes the first stage of the workflow and advances the workflow to a second stage.

The illustrative embodiments also contemplate a computer configured to execute program code which implements this method. The illustrative embodiments also contemplate a non-transitory computer-recordable storage medium storing program code, which, when executed, implements this method.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account that smart contracts on blockchains have not been used to implement a workflow system. In other words, so far, no one has attempted or designed a workflow system that utilizes the underlying technology of blockchain and smart contracts to create an open and secure payroll system that is transparent among all participating parties. Thus, the illustrative embodiments provide for using smart contracts on the blockchain to manage tasks in a workflow system. The human resources information and variables are encrypted in a workflow transaction or may be stored at a secure off-chain location to be looked up at time of processing.

Figure 1:
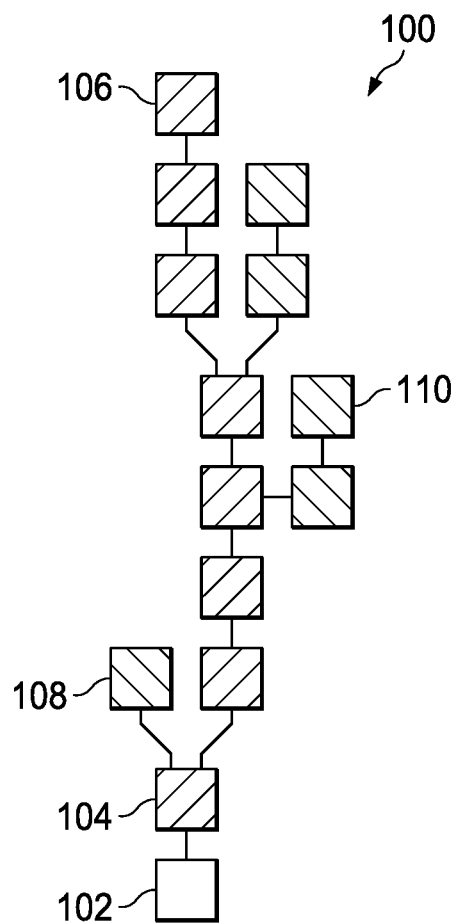
FIG. 1 is an illustration of a distributed ledger in the form of a blockchain in accordance with an illustrative embodiment.

FIG. 1 is a an illustration of a distributed ledger in the form of a blockchain depicted in accordance with an illustrative embodiment. Blockchain 100 is a blockchain, which is a specific implementation of a distributed ledger. Blockchain 100 is described to introduce blockchain concepts.

Blockchain 100 starts with genesis block 102. Blocks indicated with a right-leaning hash, such as block 104 or leaf block 106, are part of the main chain. Blocks with a left-leaning hash, such as block 108 or block 110, exist outside of blockchain 100.

Thus, blockchain 100 is a heaviest path from root block 102 to leaf block 106 through the entire block tree. The "heaviest" path through the block tree, i.e. the path that has had the most computation done upon it, is conceptually identified as blockchain 100. Identifying blockchain 100 in this manner allows a decentralized consensus to be achieved for the state of blockchain 100.

Stated more formally, a blockchain is a distributed database that maintains a continuously growing list of ordered records called blocks. Each block contains a timestamp and a link to a previous block, with the hash of the prior block linking the two. By design, blockchains are inherently resistant to modification of the data because, once recorded, the data in a block cannot be altered retroactively. Through the use of a peer-to-peer network and one or more distributed timestamping servers, a blockchain database may be managed autonomously. Thus, blockchains may be used to provide an open, distributed ledger that can record transactions between parties efficiently and in a verifiable and permanent way.

Distributed ledgers, and blockchains in particular, are secure by design. Blockchains have a high byzantine fault tolerance. Thus, a decentralized consensus can be achieved with a blockchain. The first blockchain was created by Satoshi Nakamoto in 2008 and implemented the following year as a core component of the digital currency BITCOIN®, where it serves as the public ledger for all transactions. BITCOIN® was the first digital currency to solve the double spending problem, without the use of a trusted authority or central server.

Figure 2:
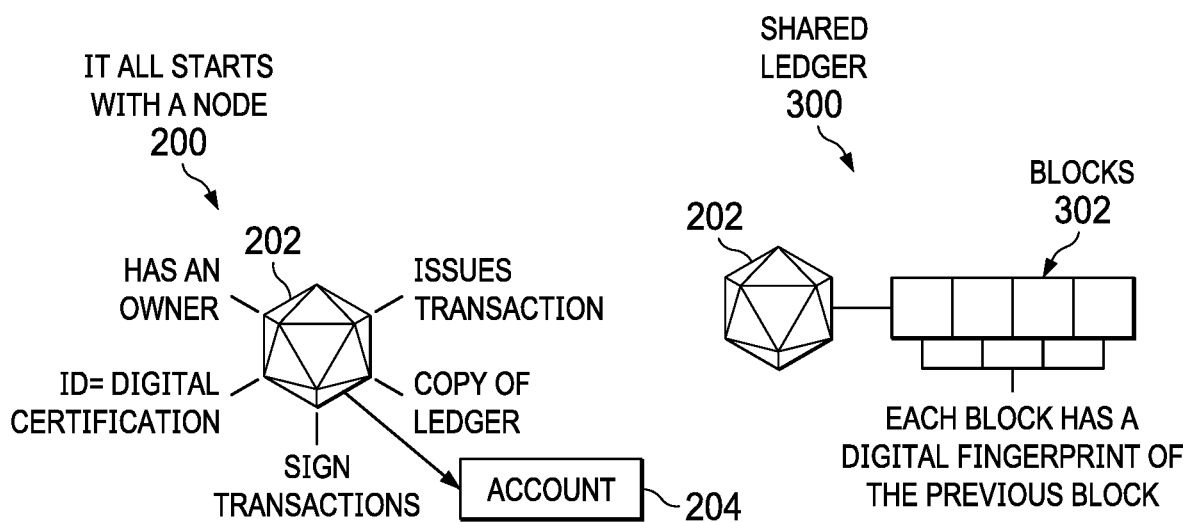
FIG. 2 is an illustration of a first step in creating a blockchain in accordance with an illustrative embodiment.
Figure 3:
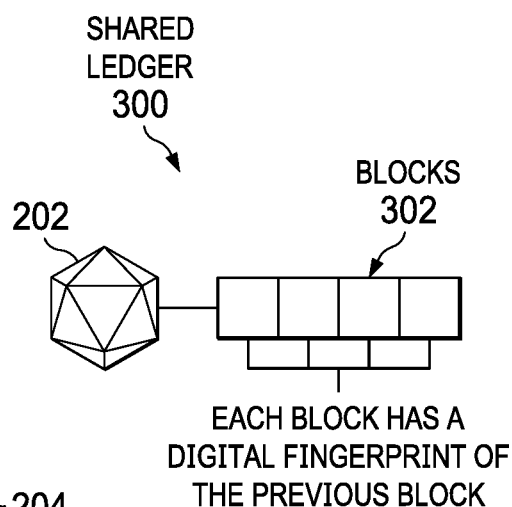
FIG. 3 is an illustration of a second step in creating a blockchain in accordance with an illustrative embodiment.
Figure 4:
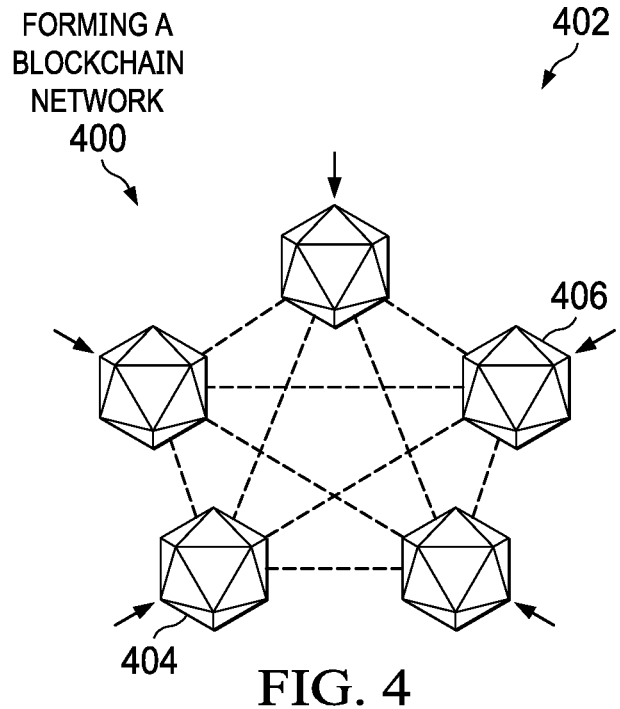
FIG. 4 is an illustration of a third step in creating a blockchain in accordance with an illustrative embodiment.
Figure 5:
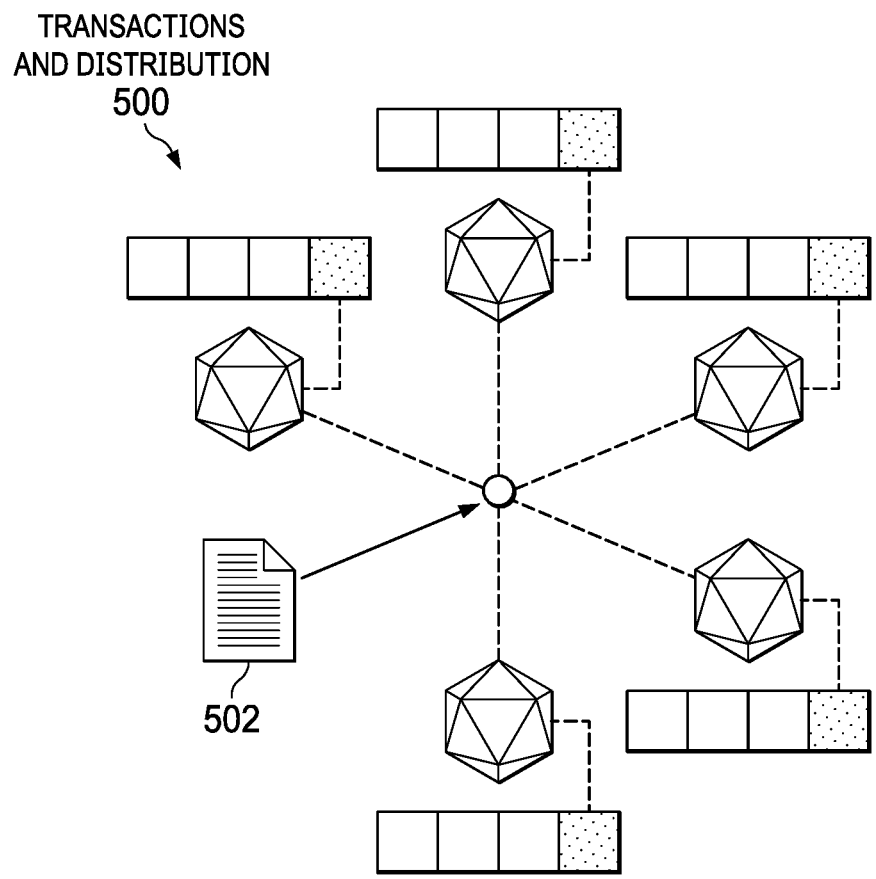
FIG. 5 is an illustration of a fourth step in creating a blockchain in accordance with an illustrative embodiment.
Figure 6:
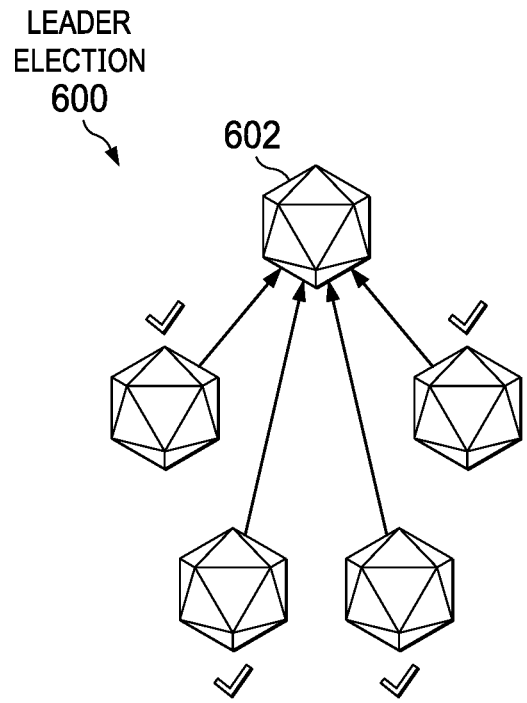
FIG. 6 is an illustration of a fifth step in creating a blockchain in accordance with an illustrative embodiment.
Figure 7:
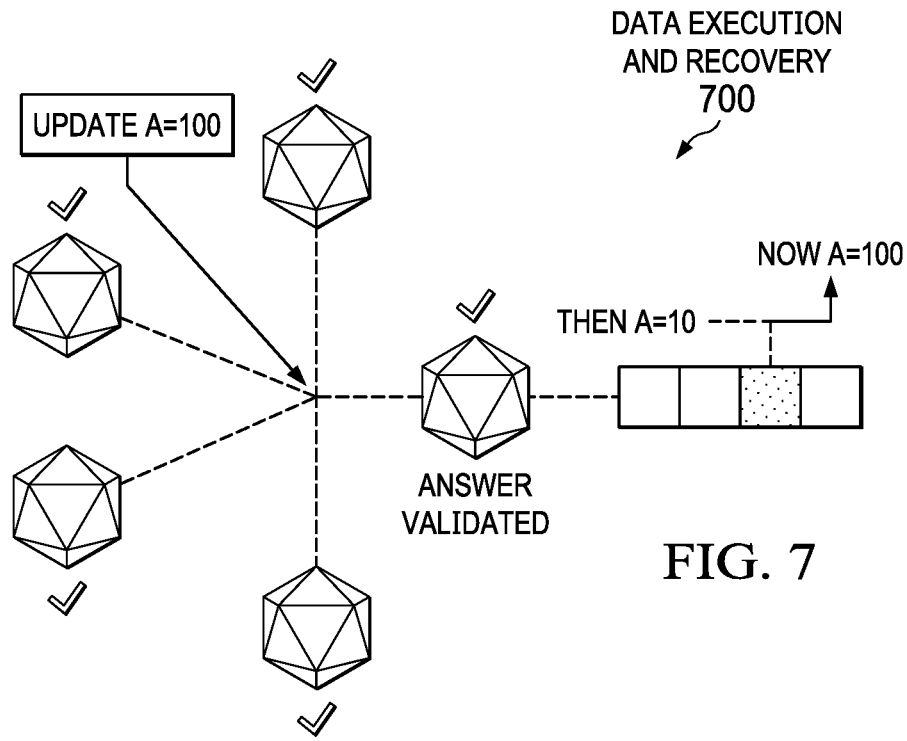
FIG. 7 is an illustration of a sixth step in creating a blockchain in accordance with an illustrative embodiment.

FIG. 2 through FIG. 7 should be considered together. FIG. 2 is an illustration of a first step in creating a blockchain depicted in accordance with an illustrative embodiment. FIG. 3 is an illustration of a second step in creating a blockchain depicted in accordance with an illustrative embodiment. FIG. 4 is an illustration of a third step in creating a blockchain depicted in accordance with an illustrative embodiment. FIG. 5 is an illustration of a fourth step in creating a blockchain depicted in accordance with an illustrative embodiment. FIG. 6 is an illustration of a fifth step in creating a blockchain depicted in accordance with an illustrative embodiment. FIG. 7 is an illustration of a sixth step in creating a blockchain depicted in accordance with an illustrative embodiment. FIG. 2 through FIG. 7 may be implemented on a computer or on multiple computers in a network environment. FIG. 2 through FIG. 7 address a technical problem that only exists in computer programming and execution. As used throughout FIG. 2 through FIG. 7, common reference numerals refer to common objects in these figures.

In operation 200 shown in FIG. 2, node 202 creates account 204 that contains the initial data for blockchain 100 of FIG. 1. Account 204 is a state object recorded in the shared ledger that represents the identity of agents that can interact with the ledger. Account 204 includes an owner, a digital certificate identification, and a copy of a ledger. Node 202 may issue transactions from account 204 for interacting with the blockchain. Node 202 may sign transactions and inspect the blockchain and its associated state. The state of a blockchain is the combined state of all nodes that have interacted with the blockchain. Node 202 may issue transactions from account 204 for interacting with the blockchain.

In operation 300 shown in FIG. 3, node 202 collates transactions and distributions into blocks 302, and adds blocks 302 to the shared ledger. Blocks 302 function as a journal, recording a series of transactions together with the previous block and an identifier for the final state of the blockchain. Blocks 302 are chained together using a cryptographic hash as a means of reference—each block in the shared ledger has a digital fingerprint of the previous block. In this manner, it is not possible to alter previous blocks without being detected.

In operation 400 shown in FIG. 4, blockchain network 402 is formed. Blockchain network 402 may include multiple nodes such as those shown in FIG. 2 or FIG. 3. Each node, such as node 404 or node 406, has its own blockchain.

In operation 500 shown in FIG. 5, transaction 502 is issued from an account, such as account 204 in FIG. 2. Transaction 502 is an instruction constructed by a node, such as node 202, and cryptographically-signed by an account, such as account 204.

There are two types of transactions: transactions that result in message calls, and transactions that result in the creation of new agent accounts, i.e., "contract creation" transactions. Transactions that result in message calls contain data specifying input data for the message.

Transactions and distributions are collated into blocks that are added to the blockchain by the various nodes. The blockchain is synchronized across the various nodes. Thus, each node in blockchain network 402 adds identical blocks to a local copy of the blockchain.

In operation 600 shown in FIG. 6, leader election takes place. In this operation, leader node 602 is elected. Leader node 602 takes priority for deciding which information is the most accurate or up-to-date. Identifying information by leader node 602, and validating this information by other nodes, allows a decentralized consensus to be achieved throughout the network for the state of blockchain 100 of FIG. 1.

In operation 700 shown in FIG. 7, data execution and recovery takes place. A query regarding data stored in one or more of the nodes may return a validated answer regarding contents in the blocks.

Figure 8:
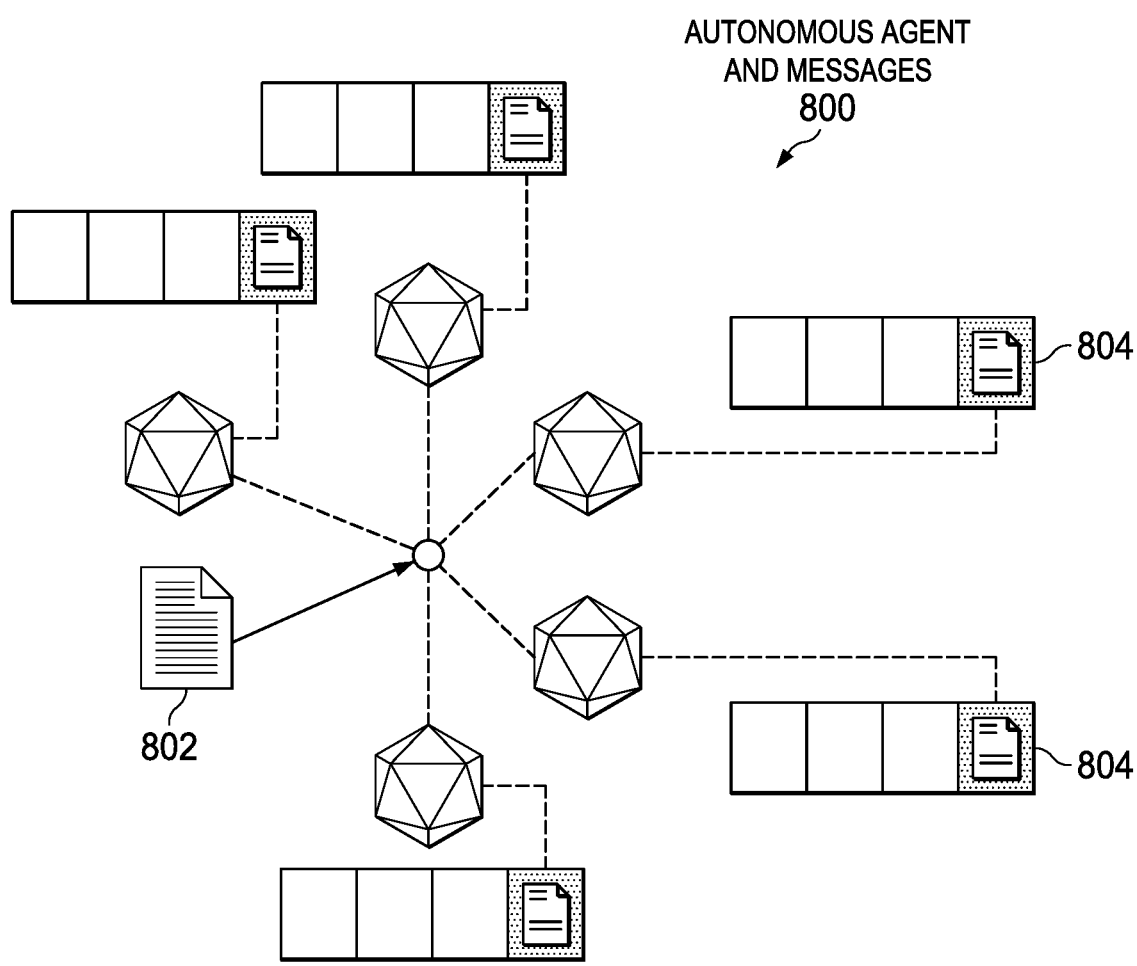
FIG. 8 is an illustration of a creation of a smart contract in accordance with an illustrative embodiment.
Figure 9:
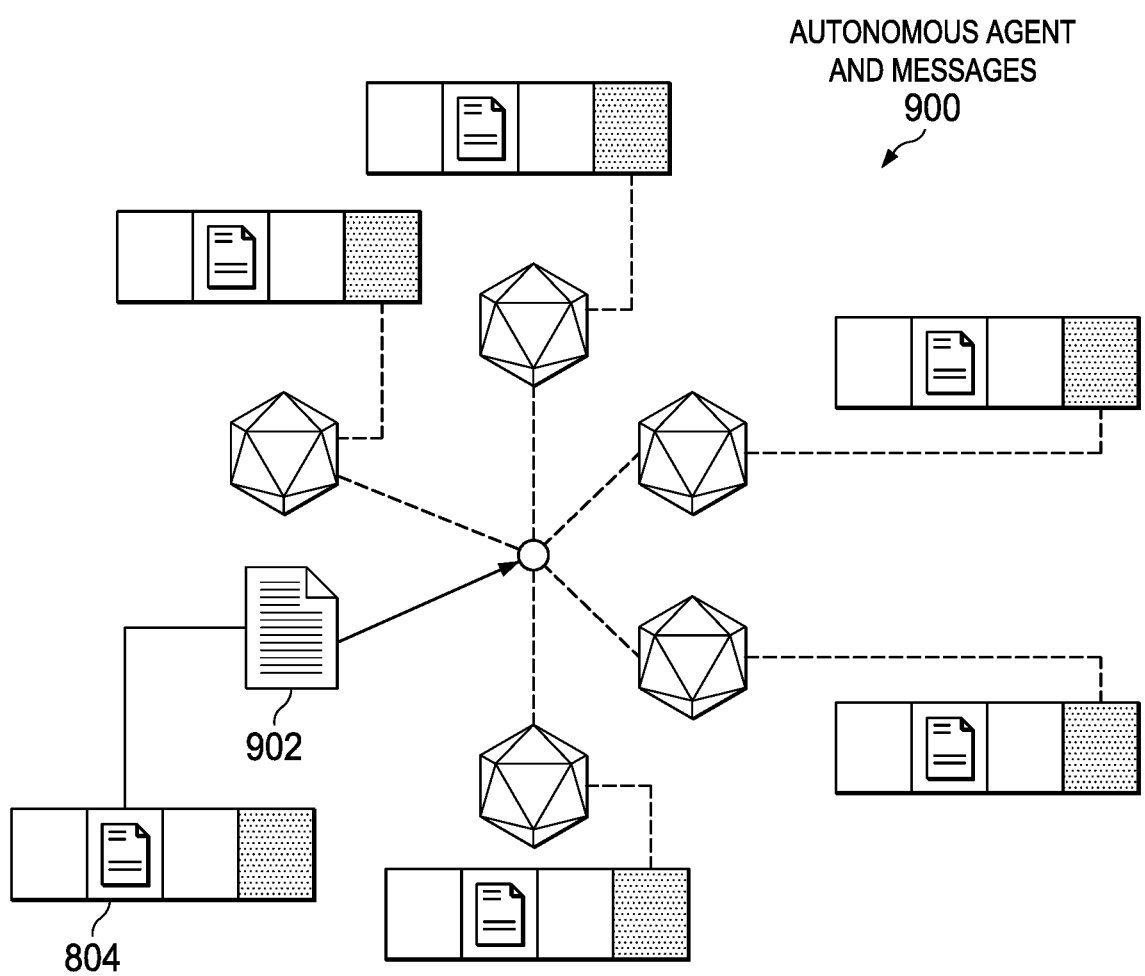
FIG. 9 is an illustration of an operation of a smart contract in accordance with an illustrative embodiment.

FIG. 8 and FIG. 9 should be considered together. FIG. 8 is an illustration of a step in creating a blockchain having a smart contract therein depicted in accordance with an illustrative embodiment. FIG. 9 is an illustration of a step in creating a blockchain using a smart contract within the blockchain depicted in accordance with an illustrative embodiment. FIG. 8 and FIG. 9 may be implemented on a computer or on multiple computers in a network environment.

In operation 800 shown in FIG. 8, transaction 802 and distributions are added to the various nodes. Thus, blocks are added to each node. As indicated above, there are two types of transactions: transactions that result in message calls, and transactions that result in the creation of new agent accounts.

Transaction 802 is a cryptographically-signed instruction constructed by a node, such as node 202 of FIG. 2. Transaction 802 results in the creation of smart contract 804. In contrast to data contained in message call transactions, such as transaction 502 in FIG. 5, transaction 802 contains data specifying initialization code for smart contract 804. Each node in a blockchain network executes this initialization code to incorporate smart contract 804 into the blockchain. In this illustrative example, the initialization code is executed at account creation and discarded immediately thereafter. The initialization code retrieves a second code fragment that executes each time the account receives a message call (either through a transaction or due to the internal execution of code).

Smart contract 804 is a type of account that is stored on the blockchain; it is a collection of code, i.e. functions, and data, i.e. state, that resides at a specific address on the blockchain. Smart contract 804 is not associated with an external node, but rather is a notional object existent only within the blockchain execution environment. Smart contract 804 has direct control over its own state, and storage memory to preserve persistent state variables. When referenced by a message or transaction, smart contract 804 executes its associated functions.

In operation 900 shown in FIG. 9, smart contract 804 generates message 902. In a contract account, every time the contract account receives a message, its code activates. Message 902 is an instruction constructed by smart contract 804 in response to receiving a message. Message 902 is a sort of "virtual transaction" sent by code from one account to another. Message 902 can specify input data that result in message calls for other accounts, allowing smart contract 804 to read and write to internal storage. Alternatively, message 902 can contain data specifying initialization code, allowing smart contract 804 to create additional smart contracts.

In this illustrative example, code for smart contract 804 can be executed as part of state transition and block validation. If a transaction is added into a block, the code execution spawned by that transaction will be executed by all nodes that download and validate the block.

Figure 10:
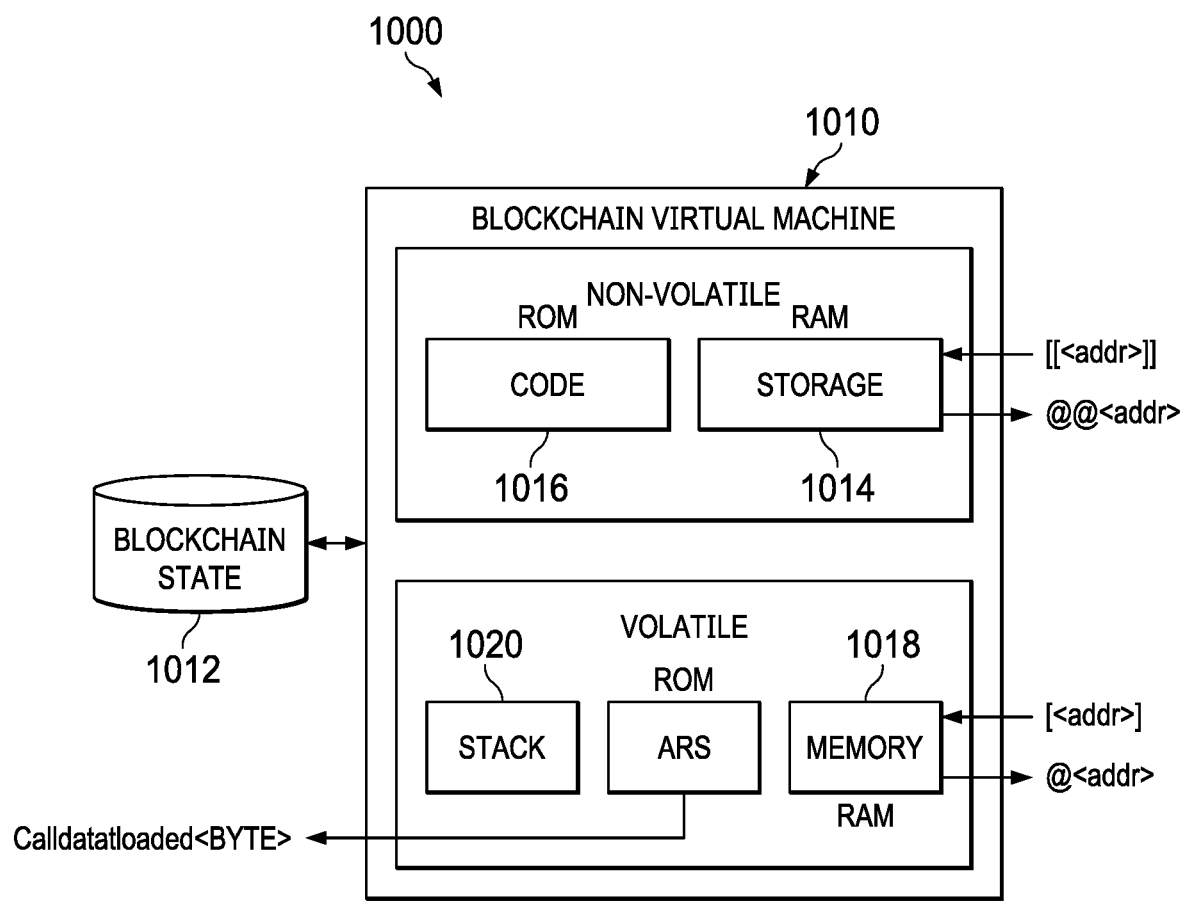
FIG. 10 is a block diagram of an execution environment for executing a smart contract stored on a blockchain in accordance with an illustrative embodiment.

With reference next to FIG. 10, a block diagram of an execution environment for executing a smart contract stored on a blockchain is depicted in accordance with an illustrative embodiment.

Blockchain environment 1000 includes a number of different components. As depicted, blockchain environment 1000 includes blockchain virtual machine 1010 and blockchain state 1012.

Blockchain virtual machine 1010 is responsible for internal account state and transaction computation for the blockchain. Blockchain virtual machine 1010 performs state transitions for smart contracts. In this illustrative example, blockchain virtual machine 1010 has a stack-based architecture that uses a last-in, first-out stack. Blockchain virtual machine 1010 executes transactions recursively, computing the system state and the machine state for each loop. Blockchain virtual machine 1010 includes non-volatile and volatile components.

Storage 1014 is non-volatile and is maintained on the blockchain as part of the system state. Every smart contract on the blockchain has its own storage. Storage 1014 preserves all the state variables for the smart contract that do not change between the function calls.

Code 1016 are instructions that formally specify the meaning and ramifications of a transaction or message to an account. Blockchain virtual machine 1010 executes code 1016 in response to receiving a message call. In contrast to standard architecture where program code is stored in generally-accessible memory, code 1016 is stored separately in a virtual ROM that cannot be changed after construction.

Memory 1018 is volatile and is cleared between external function calls. Memory 1018 stores temporary data, for instance, function arguments, local variables, and storing return values. Stack 1020 is used to hold temporary values when conducting calculations in blockchain virtual machine 1010.

Blockchain environment 1000 includes blockchain state 1012. Blockchain virtual machine 1010 relies on blockchain state 1012 for execution of certain instructions. Blockchain state 1012 can include a mapping between blockchain addresses, i.e., accounts and account states. Blockchain state 1012 may not be stored on the blockchain, but rather in a data structure on a backend state database that maintains the mapping.

Figure 11:
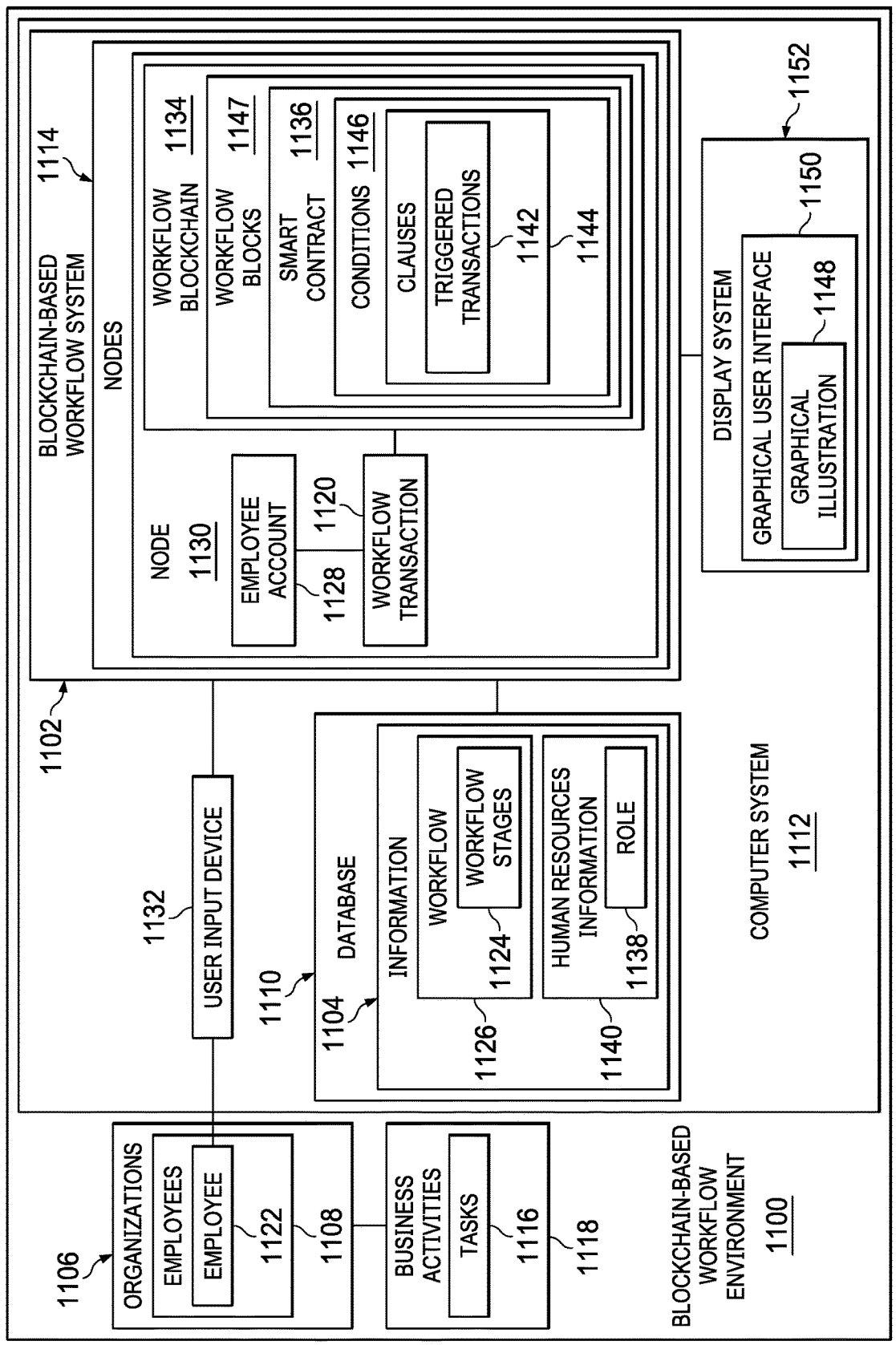
FIG. 11 is a block diagram of a blockchain-based workflow environment in accordance with an illustrative embodiment.

With reference now to FIG. 11, a block diagram of a blockchain-based workflow environment is depicted in accordance with an illustrative embodiment. As depicted, blockchain-based workflow environment 1100 includes blockchain-based workflow system 1102.

Blockchain-based workflow system 1102 may take different forms. For example, blockchain-based workflow system 1102 may be selected from one of an employee information system, a research information system, a sales information system, an accounting system, a payroll system, a human resources system, or some other type of information system that stores and provides access to information 1104.

Information 1104 can include information about organizations 1106 and employees 1108 of organizations 1106. Information 1104 may include, for example, at least one of information about people, products, research, product analysis, business plans, financials, or other information relating to organizations 1106 and employees 1108. As depicted, information 1104 is stored on database 1110.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Organizations 1106 may be, for example, a corporation, a partnership, a charitable organization, a city, a government agency, or some other suitable type of organization. Employees 1108 are people who are employed by or associated with organizations 1106. For example, employees 1108 can include at least one of employees, administrators, managers, supervisors, and third parties associated with organizations 1106.

In this illustrative example, blockchain-based workflow system 1102 is implemented in computer system 1112. Computer system 1112 is a physical hardware system and includes one or more data processing systems. When more than one data processing system is present, those data processing systems may be in communication with each other using a communications medium. The communications medium may be a network. The data processing systems may be selected from at least one of a computer, a server computer, a workstation, a tablet computer, a laptop computer, a mobile phone, or some other suitable data processing system. The network of data processing systems are nodes 1114 within blockchain-based workflow system 1102.

Blockchain-based workflow system 1102 may be implemented in software, hardware, firmware, or a combination thereof. When software is used, the operations performed by blockchain-based workflow system 1102 may be implemented in program code configured to run on hardware, such as a processor unit. When firmware is used, the operations performed by blockchain-based workflow system 1102 may be implemented in program code and data and stored in persistent memory to run on a processor unit. When hardware is employed, the hardware may include circuits that operate to perform the operations in blockchain-based workflow system 1102.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In this illustrative example, blockchain-based workflow system 1102 manages tasks 1116 of employees 1108. Tasks 1116 are identifiable quantified elements of a job performed in support of business activities 1118. Business activities 1118 can include functions, processes, activities, and transactions of organizations 1106 and employees 1108.

Business activities 1118 can include supply chain logistics and distribution activities, product development and engineering activities, production and manufacturing activities, as well as marketing and sales activities. Business activities 1118 can also include other supporting activities, such as corporate governance activities, human resources activities, and information technology activities.

Blockchain-based workflow system 1102 receives workflow transaction 1120 from employee 1122. As used herein, a "workflow" is a progression of delineated workflow stages 1124, including processes, tasks, events, or interactions that are performed in support of business activities 1118. Workflow transaction 1120 is an interaction by employee 1122 with blockchain-based workflow system 1102 indicating the performance of tasks 1116, or progress towards the performance of tasks 1116. In this example, workflow transaction 1120 is associated with a first stage of workflow 1126.

Employee 1122 may interact with blockchain-based workflow system 1102 by issuing workflow transaction 1120 via employee account 1128 at node 1130. The interaction may be made through user input generated by one or more of user input device 1132, such as, for example, a mouse, a keyboard, a trackball, a touchscreen, a stylus, or some other suitable type of user input device.

Blockchain-based workflow system 1102 records workflow transaction 1120 in workflow blockchain 1134. Smart contract 1136 is recorded within workflow blockchain 1134. Blockchain-based workflow system 1102 determines whether smart contract 1136 authorizes role 1138 for employee 1122 to perform workflow transaction 1120.

Role 1138 is a role of employee 1122 in organizations 1106. For example, role 1138 can be selected from roles including a developer, a quality assurance, a manager, and an executive, as well as other appropriate roles within organizations 1106.

In this illustrative example, role 1138 can be identified from human resources information 1140. Human resources information 1140 is information 1104 about employees 1108, including employee 1122, of organizations 1108. For example, human resources information 1140 may include at least one of payroll information, tax information, salary information, a social security number, or other types of personal financial information of employees 1108. Human resources information 1140 can include personally identifying information about employees 1108. For example, human resources information 1140 may include at least one of a social security number, a date of birth, a name, an address, a telephone number, a driver's license number, and a professional license number, as well as possibly other information that can be used to identify role 1138 of employee 1122.

Blockchain-based workflow system 1102 determines whether smart contract 1136 authorizes role 1138 for employee 1122 to perform workflow transaction 1120. For example, different roles within organizations 1106 may be responsible for performing different tasks 1116 for completion of workflow 1126. Smart contract 1136 can restrict the performance of a particular workflow transaction 1120 based on role 1138 of employee 1122 in organizations 1106.

Blockchain-based workflow system 1102 identifies employee 1122 based on employee account 1128. Employee account 1128 is an account in blockchain-based workflow system 1102 that allows employee 1122 to interact with workflow blockchain 1134. Workflow transaction 1120 submitted by employee 1122 is cryptographically signed by employee account 1128. Each workflow transaction uniquely identifies the employee account that submits the workflow transaction. For example, based on the cryptographic signature identifying employee account 1128, transaction 1120 uniquely identifies employee 1122.

Blockchain-based workflow system 1102 identifies employee account 1128 of employee 1122 from workflow transaction 1120. Blockchain-based workflow system 1102 can thereafter identify role 1138 of employee 1122 from employee account 1128 and human resources information 1140 referenced by smart contract 1136. For example, human resources information 1140 may include an index of employees 1108, allowing blockchain-based workflow system 1102 to identify role 1138 of employee 1122 based on the unique employee account 1128.

In an illustrative example, blockchain-based workflow system 1102 determines whether smart contract 1136 authorizes role 1138 for employee 1122 to perform workflow transaction 1120 from a list of authorized roles indicated in smart contract 1136. Responsive to identifying the role of the employee, blockchain-based workflow system 1102 determines whether the list of authorized roles indicated in smart contract 1136 includes role 1138 identified for employee 1122.

In response to determining that smart contract 1136 authorizes role 1138 to perform workflow transaction 1120, blockchain-based workflow system 1102 executes triggered transactions 1142 indicated by smart contract 1136. Triggered transactions 1142 are transactions issued by smart contract 1136 in response to workflow transaction 1120 being received from an authorized role 1138.

Triggered transactions 1142 can be, for example, a notification transaction sent to employees 1108, a quality check transaction, a transaction that advances workflow 1126 to a subsequent workflow stage, and a transaction that completes workflow 1126. Triggered transactions 1142 can be transactions that are sent to other nodes 1114 in blockchain-based workflow system 1102. Triggered transactions 1142 can include message calls to external applications that request the performance of triggered transaction 1142.

For example, in a continuous software development pipeline, triggered transactions 1142 can trigger a software build transaction that compiles source code into an executable format. Triggered transactions 1142 can trigger one or more automatic quality check transactions for the code. Triggered transactions 1142 can trigger a transaction that promotes code to a subsequent stage in the development pipeline.

Each set of triggered transactions 1142 can be indicated by a separate one of clauses 1144 within smart contract 1136. Triggered transactions 1142 generated by smart contract 1136 can be sent to another one of employees 1108 by sending the transaction to an associated employee account. Triggered transactions 1142 generated by smart contract 1136 can be sent to another smart contract stored in workflow blockchain 1134.

Continuing with the current example, in response to determining that smart contract 1136 authorizes role 1138 to perform workflow transaction 1120, blockchain-based workflow system 1102 updates at least one of conditions 1146 indicated in smart contract 1136. Conditions 1146 are conditions, specified in smart contract 1136, for completion of one or more of workflow stages 1124 of workflow 1126.

Blockchain-based workflow system 1102 determines whether all of conditions 1146 indicated in smart contract 1136 for completion of workflow stages 1124 of workflow 1126 have been completed. If all of conditions 1146 indicated in smart contract 1136 have been completed, blockchain-based workflow system 1102 finalizes the active one of workflow stages 1124 of workflow 1126. Thereafter, blockchain-based workflow system 1102 advances workflow 1126 to the subsequent one of workflow stages 1124.

In one illustrative example, blockchain-based workflow system 1102 finalizes workflow stages 1124 of workflow 1126 by recording workflow transaction 1120, as well as other workflow transactions submitted by employee 1122 directed to the active workflow stage, along with triggered transactions 1142. Blockchain-based workflow system 1102 records the transactions into one of workflow blocks 1147 for the active stage of workflow 1126. Node 1130 of blockchain-based workflow system 1102 attaches the workflow block to a local copy of workflow blockchain 1134. Thereafter, node 1130 of blockchain-based workflow system 1102 publishes the workflow block to other nodes 1114 in blockchain-based workflow system 1102.

In one illustrative example, node 1130 of blockchain-based workflow system 1102 displays graphical illustration 1148 of workflow 1126 in graphical user interface 1150. Graphical illustration 1148 of workflow 1126 is updated to reflect workflow transaction 1120 received from employee 1122.

In this illustrative example, computer system 1112 can display graphical illustration 1148 of workflow 1126 on display system 1152. In this illustrative example, display system 1152 can be a group of display devices. A display device in display system 1152 may be selected from one of a liquid crystal display (LCD), a light emitting diode (LED) display, an organic light emitting diode (OLED) display, and other suitable types of display devices.

In this illustrative example, each of nodes 1114 within blockchain-based workflow system 1102 maintains its own local copy of workflow blockchain 1134. Therefore, node 1130 can generate graphical illustration 1148 of workflow 1126 from its local copy of workflow blockchain 1134, independently from other nodes 1114 in blockchain-based workflow system 1102.

In a still different example, an option contract between parties may be written as program code into a blockchain. The individuals involved are anonymous, but the contract is a public ledger. A triggering event, like expiration data and strike price, is hit and the contract executes itself according to the coded terms. Regulars can use the blockchain to understand the activity in the market while maintaining the privacy of the individual actors' positions.

By managing tasks 1116 of employees 1108 using smart contract 1136 within workflow blockchain 1134, blockchain-based workflow system 1102 allows for a technological improvement that will make the workflow system more transparent across parties. With the same copy of transaction records replicated among all participating parties, when combining with modern encryption technology, the workflow system becomes more transparent among the participating parties, while providing an immutable record of submitted workflow transactions.

Smart contracts have a number of desirable properties. Execution of the smart contract is managed automatically by the network. Documents are encrypted on a shared ledger that is duplicated many times over on different nodes of the network, ensuring that the data is true and correct. Because smart contracts on distributed ledgers cannot be modified, they provide an immutable record of submitted workflow transactions that is highly resistant to post-transaction changes. Smart contracts automate workflow progression tasks that were previously performed manually, thereby saving time, possibly many hours.

In this illustrative example, blockchain-based workflow system 1102 manages tasks 1116 of employees 1108. Blockchain-based workflow system 1102 receives workflow transaction 1120 from employee 1122. Workflow transaction 1120 is associated with a first one of workflow stages 1124 of workflow 1126. Blockchain-based workflow system 1102 records workflow transaction 1120 in workflow blockchain 1134. Blockchain-based workflow system 1102 determines whether smart contract 1136 authorizes role 1138 for employee 1122 to perform workflow transaction 1120. Smart contract 1136 is recorded within workflow blockchain 1134. Responsive to determining that role 1138 is authorized to perform workflow transaction 1120, blockchain-based workflow system 1102 executes a set of triggered transactions 1142 indicated by smart contract 1136 and updates at least one of conditions 1146 indicated in smart contract 1136 for completion of the first one of workflow stages 1124 of workflow 1126. Blockchain-based workflow system 1102 determines whether all of conditions 1146 indicated in smart contract 1136 for completion of the first one of workflow stages 1124 of workflow 1126 have been completed. Responsive to determining that all conditions 1146 indicated in smart contract 1136 have been completed, blockchain-based workflow system 1102 finalizes the first one of workflow stages 1124 of workflow 1126 and advances workflow 1126 to a second one of workflow stages 1124.

The illustrative example in FIG. 11 and the examples in the other subsequent figures provide one or more technical solutions that address one or more technical problems that only exists in computers, particularly a network-centric system of computers. Specifically, blockchain-based workflow system 1102 provides an immutable record of tasks performed in the completion of a workflow, while improving accessibility and visibility of the workflow to employees within an organization. In this manner, the use of blockchain-based workflow system 1102 has a technical effect of managing tasks 1116 of employees 1108 using workflow blockchain 1134, thereby reducing time, effort, or both in the performance of business activities 1118 for organizations 1106. In this manner, business activities 1118 performed for organizations 1106 may be performed more efficiently as compared to currently used systems that do not include blockchain-based workflow system 1102.

As a result, computer system 1112 operates as a special purpose computer system in which blockchain-based workflow system 1102 in computer system 1112 manages tasks 1116 of employees 1108. Blockchain-based workflow system 1102 receives workflow transaction 1120 from employee 1122. Workflow transaction 1120 is associated with a first one of workflow stages 1124 of workflow 1126. Blockchain-based workflow system 1102 records workflow transaction 1120 in workflow blockchain 1134. Blockchain-based workflow system 1102 determines whether smart contract 1136 authorizes role 1138 for employee 1122 to perform workflow transaction 1120. Smart contract 1136 is recorded within workflow blockchain 1134. Responsive to determining that role 1138 is authorized to perform workflow transaction 1120, blockchain-based workflow system 1102 executes a set of triggered transactions 1142 indicated by smart contract 1136 and updates at least one of conditions 1146 indicated in smart contract 1136 for completion of the first one of workflow stages 1124 of workflow 1126. Blockchain-based workflow system 1102 determines whether all of conditions 1146 indicated in smart contract 1136 for completion of the first one of workflow stages 1124 of workflow 1126 have been completed. Responsive to determining that all conditions 1146 indicated in smart contract 1136 have been completed, blockchain-based workflow system 1102 finalizes the first one of workflow stages 1124 of workflow 1126 and advances workflow 1126 to a second one of workflow stages 1124.

Thus, blockchain-based workflow system 1102 transforms computer system 1112 into a special purpose computer system as compared to currently available general computer systems that do not have blockchain-based workflow system 1102. Currently used general computer systems do not provide an immutable record of tasks performed in the completion of a workflow, while improving accessibility and visibility of the workflow to employees within an organization.

Figure 12:
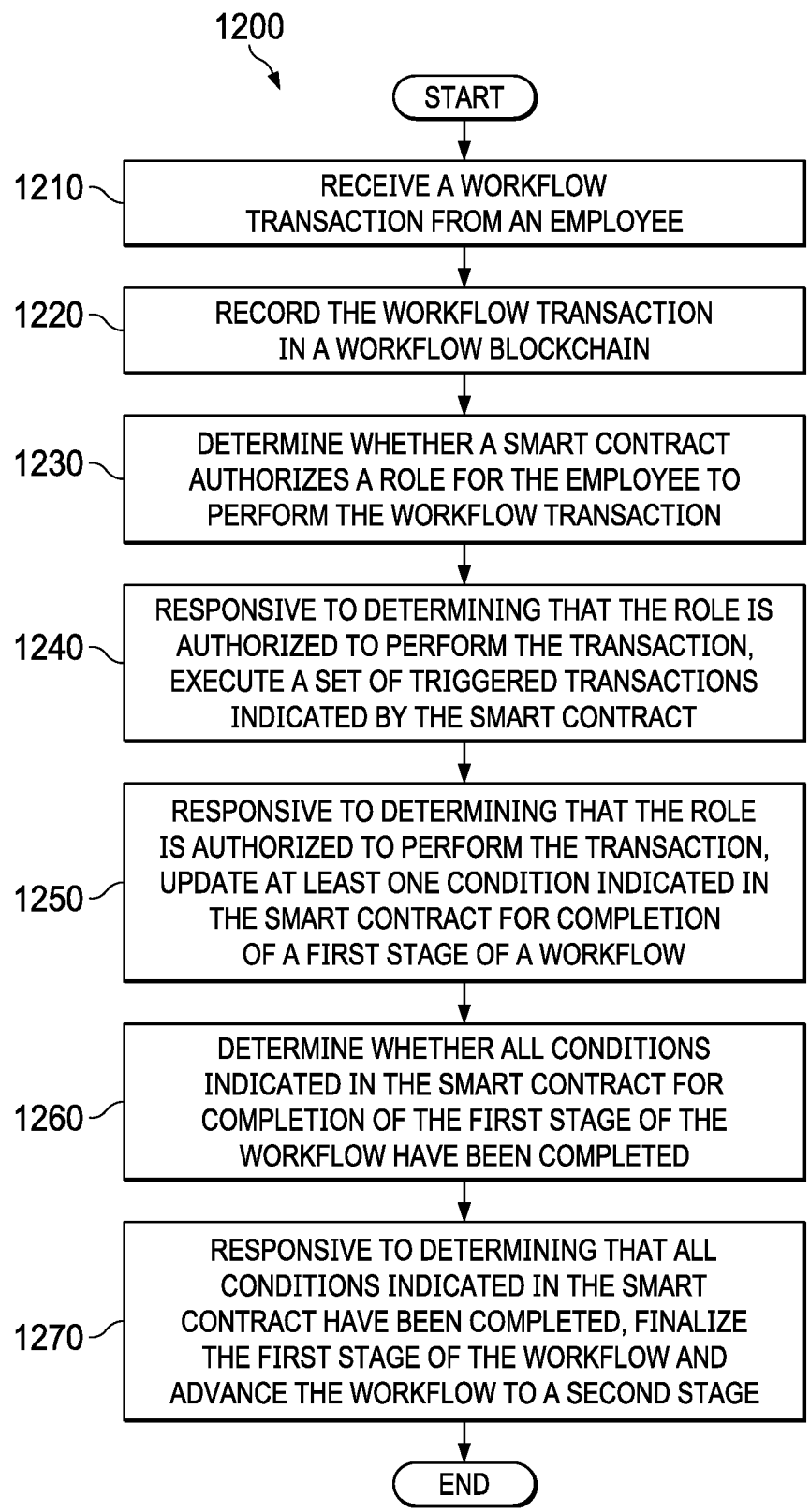
FIG. 12 is a flowchart of a process for managing tasks of employees within a blockchain-based workflow system in accordance with an illustrative embodiment.

With reference next to FIG. 12, a flowchart of a process for managing tasks of employees within a blockchain-based workflow system is depicted in accordance with an illustrative embodiment. The process of FIG. 12 can be a software process implemented in one or more components of a blockchain-based workflow system 1102 of FIG. 11.

Process 1200 receives a workflow transaction from an employee (step 1210). The workflow transaction is associated with a first stage of a workflow. Next, process 1200 records the workflow transaction in a workflow blockchain (step 1220).

Process 1200 determines whether a smart contract authorizes a role for the employee to perform the workflow transaction (step 1230). The smart contract is recorded within the workflow blockchain.

Responsive to determining that the role is authorized to perform the transaction, process 1200 executes a set of triggered transactions indicated by the smart contract (step 1240), and updates at least one condition indicated in the smart contract for completion of a first stage of a workflow (step 1250).

Process 1200 determines whether all conditions indicated in the smart contract for completion of the first stage of the workflow have been completed (step 1260). Responsive to determining that all of the conditions indicated in the smart contract have been completed, process 1200 finalizes the first stage of the workflow and advances the workflow to a second stage (step 1270), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 13:
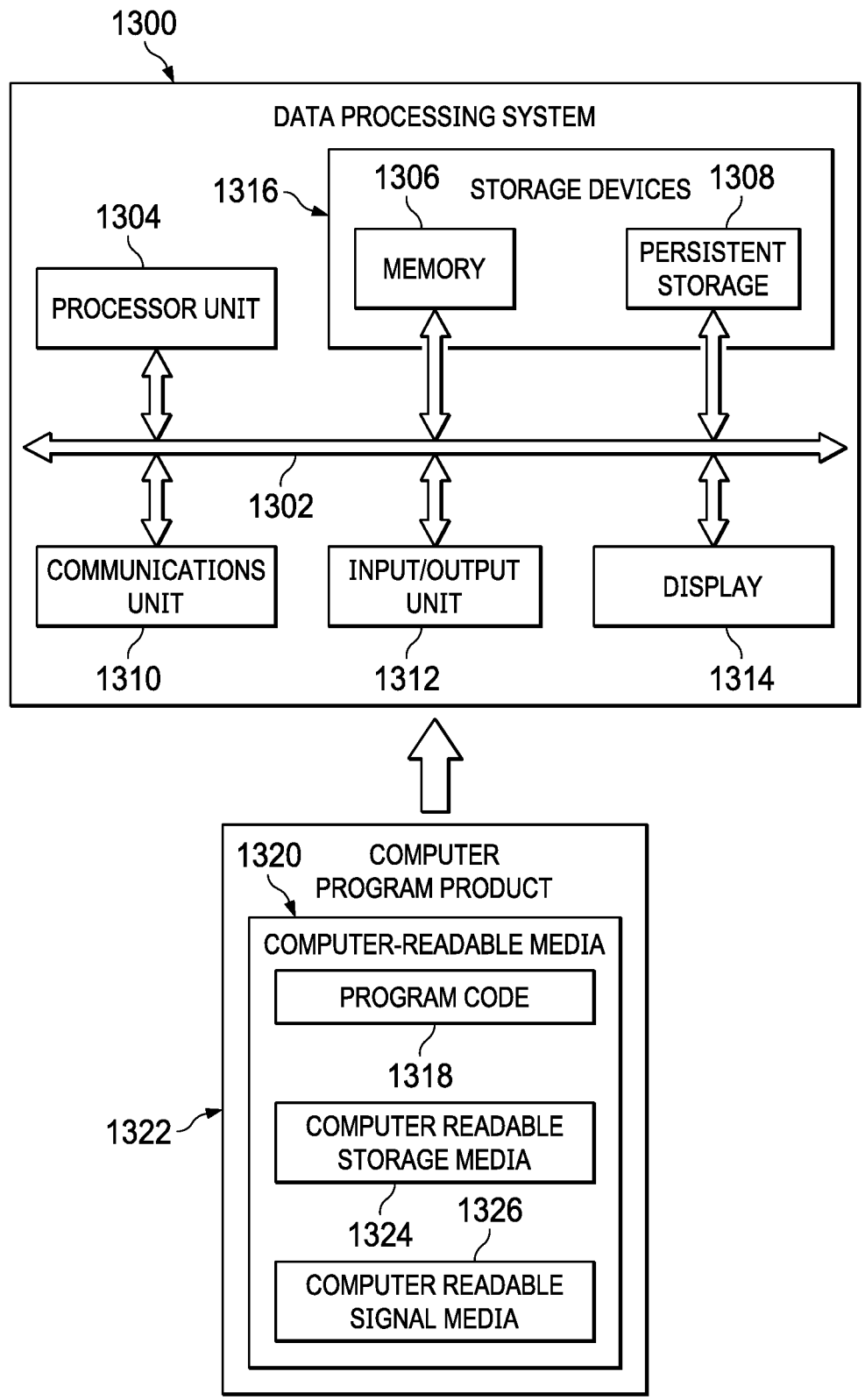
FIG. 13 is a block diagram of a data processing system in accordance with an illustrative embodiment.

Turning now to FIG. 13, an illustration of a block diagram of a data processing system is depicted in accordance with an illustrative embodiment. Data processing system 1300 may be used to implement computer system 1112, nodes 1114, and other data processing systems that may be used in blockchain-based workflow environment 1100 in FIG. 11.

In this illustrative example, data processing system 1300 includes communications framework 1302, which provides communications between processor unit 1304, memory 1306, persistent storage 1308, communications unit 1310, input/output (I/O) unit 1328, and display 1314. In this example, communications framework 1302 may take the form of a bus system.

Processor unit 1304 serves to execute instructions for software that may be loaded into memory 1306. Processor unit 1304 may be a number of processors, a multi-processor core, or some other type of processor, depending on the particular implementation.

Memory 1306 and persistent storage 1308 are examples of storage devices 1316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1316 may also be referred to as computer readable storage devices in these illustrative examples. Memory 1306, in these examples, may be, for example, a random access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a solid state hard drive, a flash memory, a rewritable optical disk, a rewritable magnetic tape, or some combination of the above. The media used by persistent storage 1308 also may be removable. For example, a removable hard drive may be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that may be connected to data processing system 1300. For example, input/output unit 1312 may provide a connection for user input through at least one of a keyboard, a mouse, or some other suitable input device. Further, input/output unit 1312 may send output to a printer. Display 1314 provides a mechanism to display information to a user.

Instructions for at least one of the operating system, applications, or programs may be located in storage devices 1316, which are in communication with processor unit 1304 through communications framework 1302. The processes of the different embodiments may be performed by processor unit 1304 using computer-implemented instructions, which may be located in a memory, such as memory 1306.

These instructions are referred to as program code, computer usable program code, or computer readable program code that may be read and executed by a processor in processor unit 1304. The program code in the different embodiments may be embodied on different physical or computer readable storage media, such as memory 1306 or persistent storage 1308.

Program code 1318 is located in a functional form on computer readable media 1320 that is selectively removable and may be loaded onto or transferred to data processing system 1300 for execution by processor unit 1304. Program code 1318 and computer readable media 1320 form computer program product 1322 in these illustrative examples. In one example, computer readable media 1320 may be computer readable storage media 1324 or computer readable signal media 1326.

In these illustrative examples, computer readable storage media 1324 is a physical or tangible storage device used to store program code 1318 rather than a medium that propagates or transmits program code 1318.

Alternatively, program code 1318 may be transferred to data processing system 1300 using computer readable signal media 1326. Computer readable signal media 1326 may be, for example, a propagated data signal containing program code 1318. For example, computer readable signal media 1326 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1300 are not meant to provide architectural limitations to the manner in which different embodiments may be implemented. The different illustrative embodiments may be implemented in a data processing system including components in addition to or in place of those illustrated for data processing system 1300. Other components shown in FIG. 13 can be varied from the illustrative examples shown. The different embodiments may be implemented using any hardware device or system capable of running program code 1318.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of managing tasks of employees within a blockchain-based workflow system, the method comprising:
   receiving a workflow transaction from an employee, wherein the workflow transaction is associated with a first stage of the workflow;
   recording the workflow transaction in a workflow blockchain;
   determining whether a smart contract authorizes a role for the employee to perform the workflow transaction, wherein the smart contract is recorded within the workflow blockchain;
   responsive to determining that the role is authorized to perform the transaction, executing a set of triggered transactions indicated by the smart contract and updating at least one condition indicated in the smart contract for completion of the first stage of the workflow;
   determining whether all conditions indicated in the smart contract for completion of the first stage of the workflow have been completed; and
   responsive to determining that all conditions indicated in the smart contract have been completed, finalizing the first stage of the workflow and advancing the workflow to a second stage,
   wherein finalizing the first stage of the workflow further comprises:
   collecting the workflow transaction and the set of triggered transactions into a workflow block for the first stage of the workflow;
   attaching the workflow block to a local copy of the blockchain; and
   publishing the workflow block to the blockchain-based workflow system.

2. The method of claim 1, wherein determining whether the smart contract authorizes the role for the employee to perform the workflow transaction further comprises:
   identifying a workflow account of the employee from the workflow transaction;
   identifying the role of the employee from the workflow account and human resources information referenced by the smart contract; and
   responsive to identifying the role of the employee, determining whether a list of authorized roles indicated in the smart contract includes the role of the employee.

3. The method of claim 1, wherein the role for the employee is selected from at least one of a developer, a quality assurance, manager, and an executive.

4. The method of claim 1, wherein each of the set of triggered transactions is indicated by an separate clause within the smart contract, and wherein each of the set of triggered transactions is generated by the smart contract and sent to at least one of another employee, another smart contract, and combinations thereof.

5. The method of claim 4, wherein the set of triggered transactions comprises at least one of a notification transaction, a build trigger transaction, a quality check transaction, a promotion of code transaction, and combinations thereof.

6. The method of claim 1, wherein the set of triggered transactions includes a notification transaction, the method further comprising:
   displaying a graphical illustration of the workflow in a graphical user interface;
   wherein the graphical illustration of the workflow is updated to reflect the workflow transaction received from the employee; and
   wherein each node computer within the blockchain-based workflow system independently generates the graphical illustration of the workflow from a local copy of the workflow blockchain.

7. A computer system comprising:
   a hardware processor; and
   a blockchain-based workflow system in communication with the hardware processor, wherein a blog chain workflow system is configured:
   to receive a workflow transaction from an employee, wherein the workflow transaction is associated with a first stage of the workflow;
   to record the workflow transaction in a workflow blockchain;
   to determine whether a smart contract authorizes a role for the employee to perform the workflow transaction, wherein the smart contract is recorded within the workflow blockchain;
   responsive to determining that the role is authorized to perform the transaction, to execute a set of triggered transactions indicated by the smart contract and updating at least one condition indicated in the smart contract for completion of the first stage of the workflow;
   to determine whether all conditions indicated in the smart contract for completion of the first stage of the workflow have been completed; and
responsive to determining that all conditions indicated in the smart contract have been completed, to finalize the first stage of the workflow and advancing the workflow to a second stage,
   wherein in finalizing the first stage of the workflow, the blockchain workflow system is further configured:
   to collect the workflow transaction and the set of triggered transactions into a workflow block for the first stage of the workflow;
   to attach the workflow block to a local copy of the blockchain; and
   to publish the workflow block to the blockchain-based workflow system.

8. The computer system of claim 7, wherein in determining whether the smart contract authorizes the role for the employee to perform the workflow transaction, the blockchain-based workflow system is further configured:
   to identify a workflow account of the employee from the workflow transaction;
   to identify the role of the employee from the workflow account and human resources information referenced by the smart contract; and
   responsive to identifying the role of the employee, to determine whether a list of authorized roles indicated in the smart contract includes the role of the employee.

9. The computer system of claim 7, wherein the role for the employee is selected from at least one of a developer, a quality assurance, a manager, and an executive.

10. The computer system of claim 7, wherein each of the set of triggered transactions is indicated by an separate clause within the smart contract, and wherein each of the set of triggered transactions is generated by the smart contract and sent to at least on of another employee, another smart contract, and combinations thereof.

11. The computer system of claim 10, wherein the set of triggered transactions comprises at least one of a notification transaction, a build trigger transaction, a quality check transaction, a promotion of code transaction, and combinations thereof.

12. The computer system of claim 7, wherein the set of triggered transactions includes a notification transaction, the blockchain-based workflow system is furthe configured:
   to display a graphical illustration of the workflow in a graphical user interface;
   wherein the graphical illustration of the workflow is updated to reflect the workflow transaction received from the employee; and
   wherein each node computer within the blockchain-based workflow system independently generates the graphical illustration of the workflow from a local copy of the workflow blockchain.

13. A computer program product for managing tasks of employees within a blockchain-based workflow system, the computer program product comprising:
   a computer readable storage media;
   program code, stored on the computer readable storage media, for receiving a workflow transaction from an employee, wherein the workflow transaction is associated with a first stage of the workflow;
   program code, stored on the computer readable storage media, for recording the workflow transaction in a workflow blockchain;
   program code, stored on the computer readable storage media, for determining whether a smart contract authorizes a role for the employee to perform the workflow transaction, wherein the smart contract is recorded within the workflow blockchain;
   program code, stored on the computer readable storage media, responsive to determining that the role is authorized to perform the transaction, for executing a set of triggered transactions indicated by the smart contract and updating at least one condition indicated in the smart contract for completion of the first stage of the workflow;
   program code, stored on the computer readable storage media, for determining whether all conditions indicated in the smart contract for completion of the first stage of the workflow have been completed; and
program code, stored on the computer readable storage media, responsive to determining that all conditions indicated in the smart contract have been completed, for finalizing the first stage of the workflow and advancing the workflow to a second stage,
   wherein the program code for finalizing the first stage of the workflow further comprises:
   program code, stored on the computer readable storage media, for collecting the workflow transaction and the set of triggered transactions into a workflow block for the first stage of the workflow;

program code, stored on the computer readable storage media, for attaching the workflow block to a local copy of the blockchain; and program code, stored on the computer readable storage media, for publishing the workflow block to the blockchain-based workflow system.

14. The computer program product of claim 13, wherein program code for determining whether the smart contract authorizes the role for the employee to perform the workflow transaction further comprises:

program code, stored on the computer readable storage media, for identifying a workflow account of the employee from the workflow transaction;

program code, stored on the computer readable storage media, for identifying the role of the employee from the workflow account and human resources information referenced by the smart contract; and program code, stored on the computer readable storage media, responsive to identifying the role of the employee, for determining whether a list of authorized roles indicated in the smart contract includes the role of the employee.

15. The computer program product of claim 13, wherein the role for the employee is selected from at least one of a developer, a quality assurance, a manager, and an executive.

16. The computer program product of claim 13, wherein each of the set of triggered transactions is indicated by an separate clause within the smart contract, and wherein each of the set of triggered transactions is generated by the smart contract and sent to at least one of another employee, another smart contract, and combinations thereof.

17. The computer program product of claim 16, wherein the set of triggered transactions comprises at least one of a notification transaction, a build trigger transaction, a quality check transaction, a promotion of code transaction, and combinations thereof.

18. The computer program product of claim 13, wherein the set of triggered transactions includes a notification transaction, the computer program product further comprising:

program code, stored on the computer readable storage media, for displaying a graphical illustration of the workflow in a graphical user interface;

wherein the graphical illustration of the workflow is updated to reflect the workflow transaction received from the employee; and wherein each node computer within the blockchain-based workflow system independently generates the graphical illustration of the workflow from a local copy of the workflow blockchain.

* * * * *